United States Patent [19]
Shen

[11] Patent Number: 5,632,193
[45] Date of Patent: May 27, 1997

[54] APPARATUS FOR MAKING TEA

[76] Inventor: Shun-Tsung Shen, P.O. Box 82-144, Taipei, Taiwan

[21] Appl. No.: 703,996

[22] Filed: Aug. 28, 1996

[51] Int. Cl.[6] .................. A47J 31/00; A47J 31/04; A47J 31/24; A47J 31/42
[52] U.S. Cl. .................. 99/285; 99/289 R; 99/295; 99/299; 99/302 R; 99/305
[58] Field of Search .................. 99/300–315, 323.3, 99/279–291, 510–513, 292–299; 426/77–82

[56] References Cited

U.S. PATENT DOCUMENTS

| | | | |
|---|---|---|---|
| 3,566,770 | 3/1971 | Crossley | 99/289 R |
| 3,814,004 | 6/1974 | Thornton | 99/283 |
| 3,844,206 | 10/1974 | Weber | 99/295 |
| 4,266,471 | 5/1981 | Rosengren | 99/305 |
| 4,354,427 | 10/1982 | Filipowicz et al. | 99/307 |
| 4,426,920 | 1/1984 | Phillips et al. | 99/307 |
| 4,527,467 | 7/1985 | Siemensma | 99/279 |
| 4,653,390 | 3/1987 | Hayes | 99/281 |
| 4,771,680 | 9/1988 | Snowball et al. | 99/295 |
| 4,825,758 | 5/1989 | Snowball et al. | 99/305 X |
| 4,843,954 | 7/1989 | Henn | 99/299 X |
| 5,025,714 | 6/1991 | Brewer | 99/295 X |
| 5,367,946 | 11/1994 | Yasunaga | 99/286 |

*Primary Examiner*—Timothy F. Simone
*Attorney, Agent, or Firm*—Alfred Lei

[57] ABSTRACT

An apparatus for making tea which includes a tea cup having two stepped flow guide ribs raised from the inside wall and two swivel locking plates pivoted to the flow guide ribs, an infusion container supported on steps on the stepped flow guide ribs and retained in place by the swivel locking plates and having a bottom drain hole, a filter mounted inside the infusion container and covered over the drain hole and having an axle housing at the center, a ball forced by a return spring into engagement with the drain hole to stop its passage, a pull rod sliding in the axle housing of the filter and pulled to lift the ball from the drain hole for permitting prepared tea to flow out of the infusion container into the tea cup.

4 Claims, 10 Drawing Sheets

APPARATUS FOR MAKING TEA

BACKGROUND OF THE INVENTION

1. Field of the Invention

This invention relates to an apparatus for making tea comprises a cup covered with a cover, and an infusion maker suspended in the cup and having bottom hole controlled by a ball and a spring through the operation of a pull rod for letting prepared tea to be carried away from the infusion container into the cup.

2. Description of the Prior Art

Figure 1:
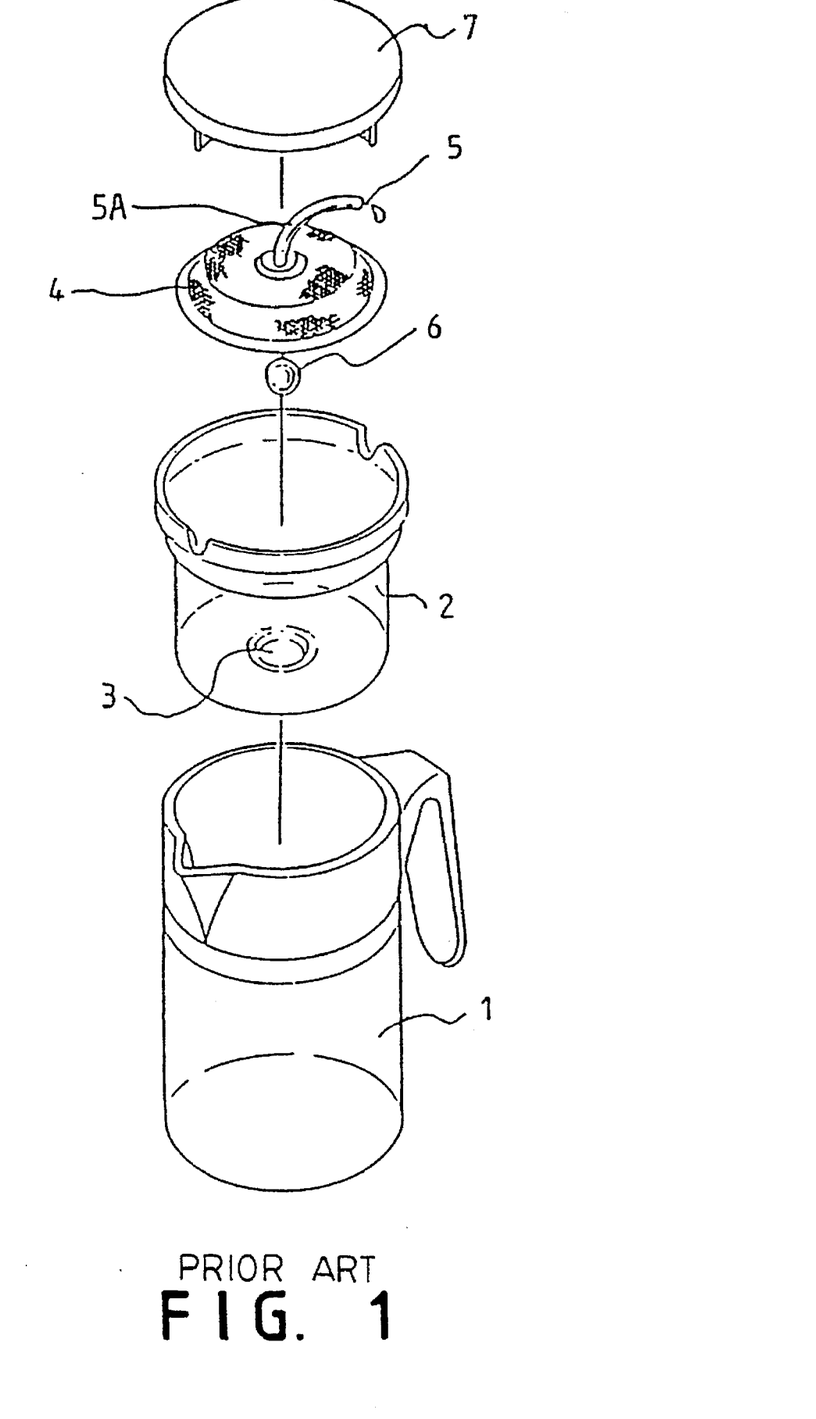
FIG. 1 is an exploded view of a tea maker according to the prior art.

When to prepare tea, a special equipment for example a tea maker shall be used so that a good taste of tea can be prepared from tea leaves. FIG. 1 shows a conventional tea maker comprised of a tea cup (1), an inner cup (2) suspending in the tea cup (1) and having a bottom drain hole (3), a wire gauze filter (4) mounted in the inner cup (2) and covered over the bottom drain hole (3), a control valve (5A) for controlling the passage of the bottom drain hole (3), and a cover (7) covered on the tea cup (1) over the inner cup (2). The control valve (5A) comprises a steel pull wire (5) inserted through a hole on the wire gauze filter (4), and a ball (6) fitted in the bottom drain hole (3) and connected to the steel pull wire (5). When tea is prepared, the steel pull wire (5) is pulled outwards to lift the ball (6) from the bottom drain hole (3), thereby causing tea to flow from the inner cup (2) to the tea cup (1). This structure of tea maker has drawbacks. One drawback of this structure of tea maker is that the connection between the steel pull wire (5) and the ball (6) tends to be broken when the steel pull wire (5) is pulled with an excessive force. Another drawback of this structure of tea maker is that there is no stop means to limit the stroke of the steel pull wire (5), and the tea maker tends to be forced to fall when the steel pull wire (5) is pulled outwards. Furthermore, because the wire gauze filter (4) is fixed to the inner cup (2) by screws, it is inconvenient to disconnect the wire gauze filter (4) from the inner cup 2 during a maintenance work.

SUMMARY OF THE INVENTION

This invention relates to an apparatus for making tea comprises a cup covered with a cover, and an infusion maker suspended in the cup and having bottom hole controlled by a ball and a spring through the operation of a pull rod for letting prepared tea to be carried away from the infusion container into the cup.

According to the preferred embodiment of the present invention, the apparatus for making tea comprises a tea cup, the tea cup comprising two longitudinal flow guide ribs raised from an inside wall thereof, each of the longitudinal flow guide ribs having a step in the middle, an upright top pin at the top, and a swivel locking plate turned about the upright top pin; an infusion container supported on the steps of the longitudinal flow guide ribs inside the tea cup and locked in place by the swivel locking plates, the infusion container comprising a drain hole at the center of a bottom wall thereof, a plurality of smoothly curved grooves radially extending from the drain hole, and a plurality of raised portions raised around the bottom wall; a wire gauze filter installed in the infusion container, covered over the drain hole, and retained in place by the raised portions of the infusion container, having an axle housing at the center; a ball adapted for controlling the passage of the drain hole; a return spring retained between the ball and the wire gauze filter; a pull rod sliding in the axle housing of the wire gauze filter and pulled to lift the ball from the drain hole for permitting tea to flow out of the infusion container into the tea cup, having a bottom end inserted through the return spring and connected to the ball; a container lid adapted for covering the infusion container, the container lid having a knob raised from a recessed top side thereof, and an annular groove at a bottom side thereof adapted for coupling to the infusion container; and a tea cup cover adapted for covering the tea cup, the tea cup cover having a downward flange adapted for coupling to the knob of the container lid, and an bottom annular groove adapted for coupling to the tea cup.

DETAILED DESCRIPTION OF THE PREFERRED EMBODIMENT

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
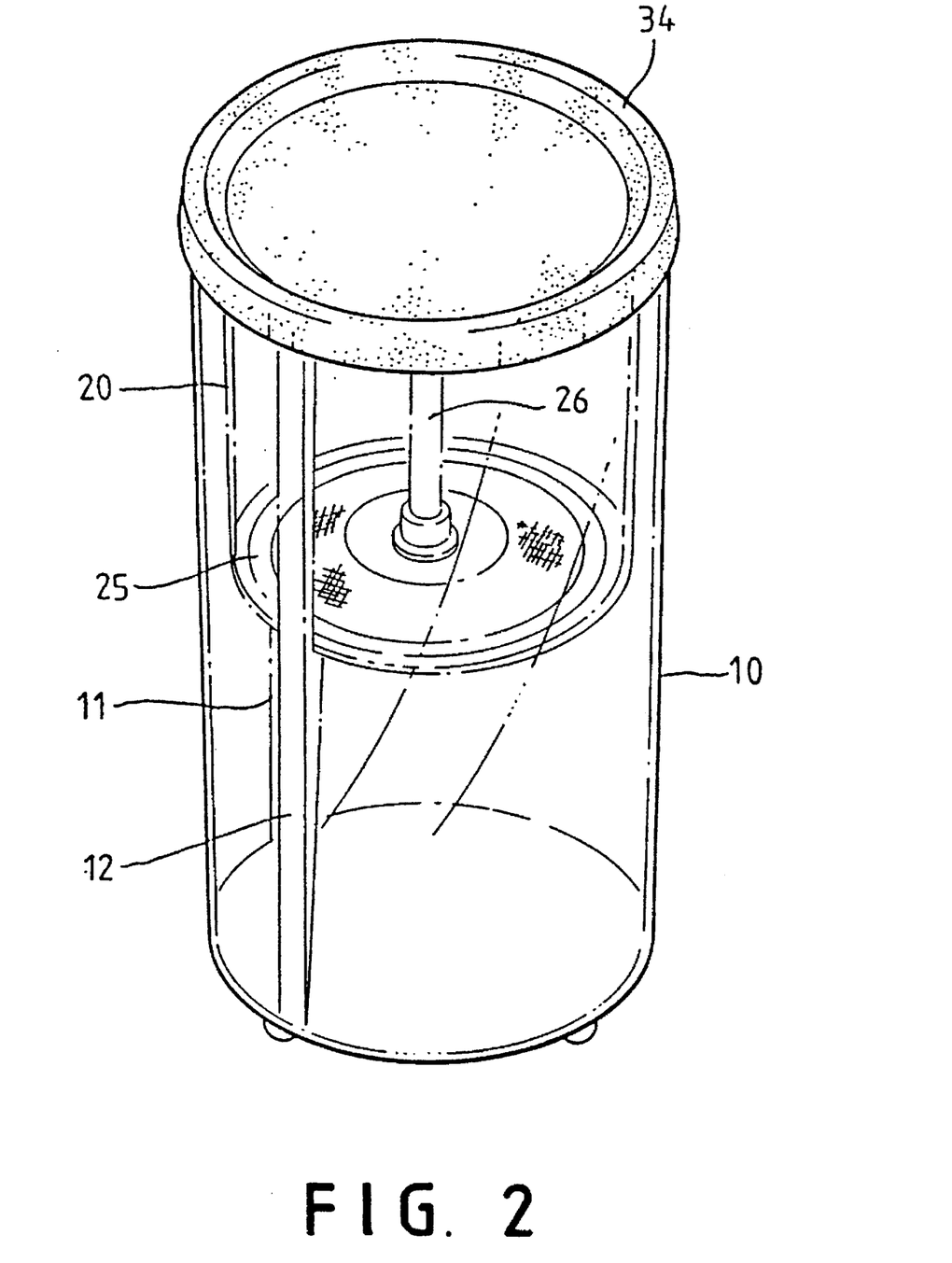
FIG. 2 is an elevational view of an apparatus for making tea according to the present invention.
Figure 3:
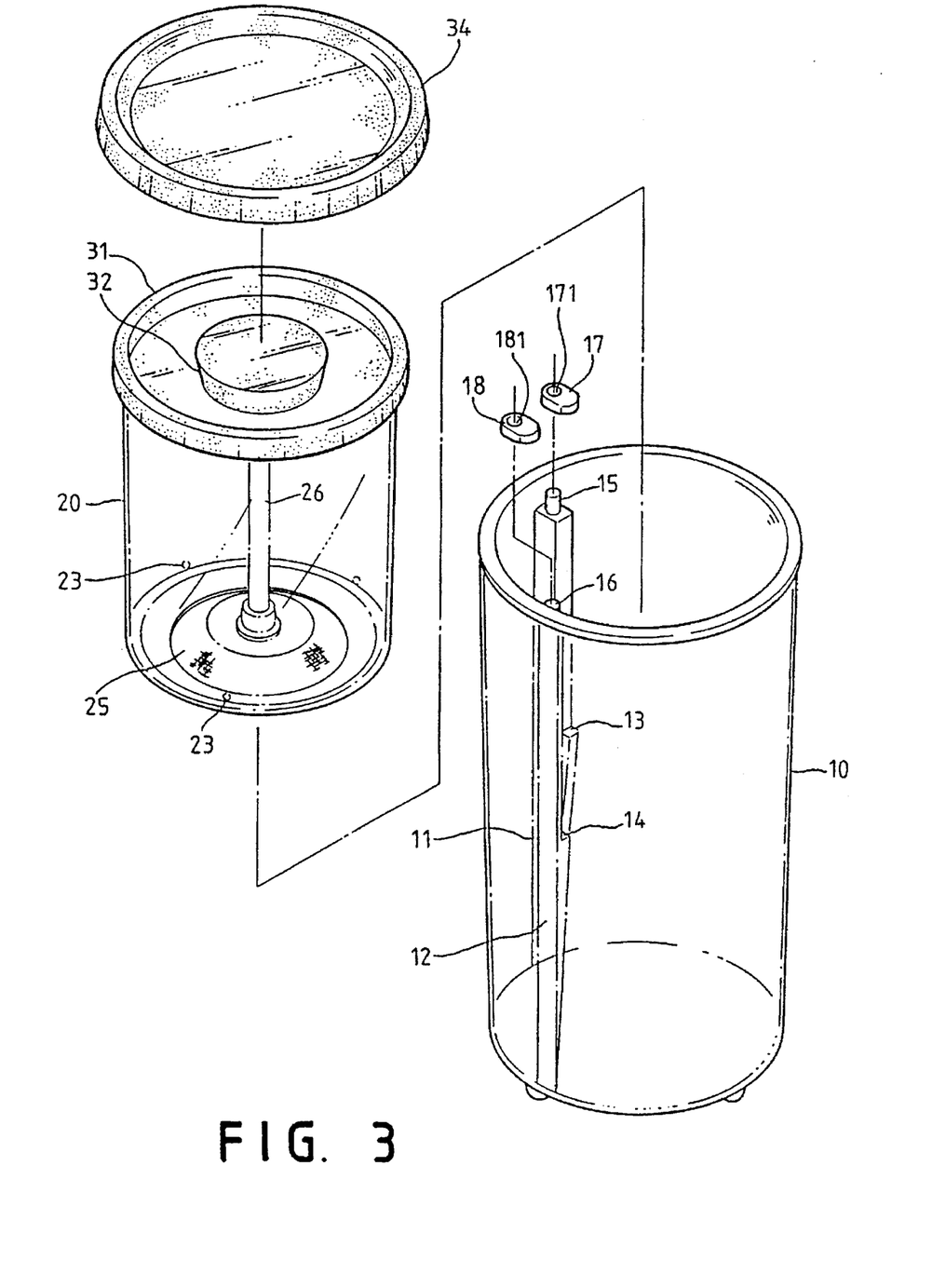
FIG. 3 is an exploded view of the apparatus for making tea shown in FIG. 2.

Referring to FIGS. 2 and 3, an apparatus for making tea in accordance with the present invention is generally comprised of a tea cup 10, a tea cup cover 34 adapted for covering on the tea cup 10, and an infusion maker suspending in the tea cup 10. The tea cup 10 comprises two longitudinal flow guide ribs 11, 12 raised from the inside wall thereof. The longitudinal flow guide ribs 11, 12 have a respective step 13, 14 in the middle, a respective upright top pin 15, 16, and a respective swivel lock 17, 18 turned about the respective upright top pin 15, 16. The swivel lock 17 or 18 is a flat locking plate having a hole 171 or 181 at one end coupled to the upright top pin 15 or 16. When the swivel lock 17 or 18 is coupled to the upright top pin 15 or 16, the top end of the upright top pin 15 or 16 is melted to form a head, which stops the swivel lock 17 or 18 in place.

Figure 4:
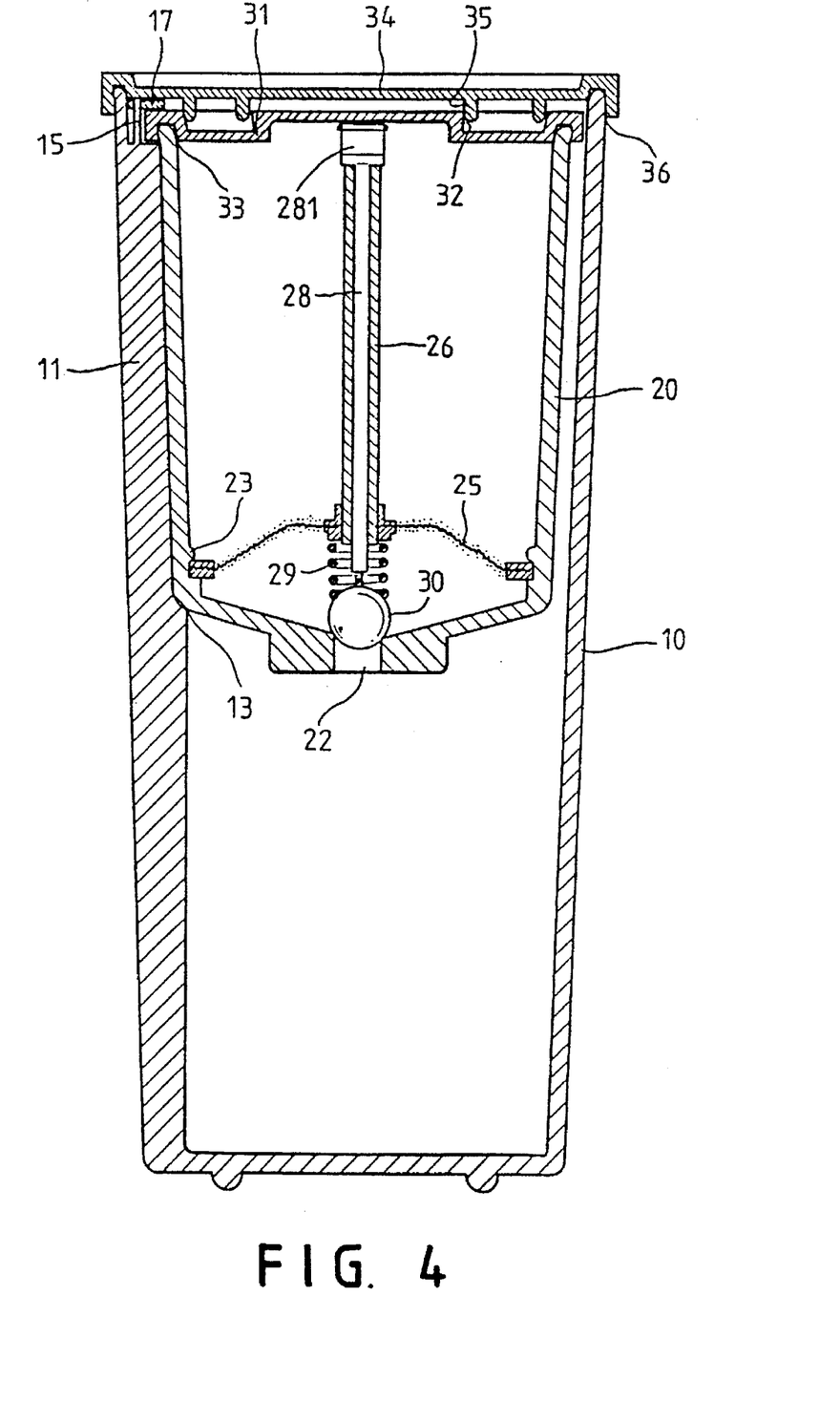
FIG. 4 is a sectional side view of the apparatus for making tea shown in FIG. 2.
Figure 5:
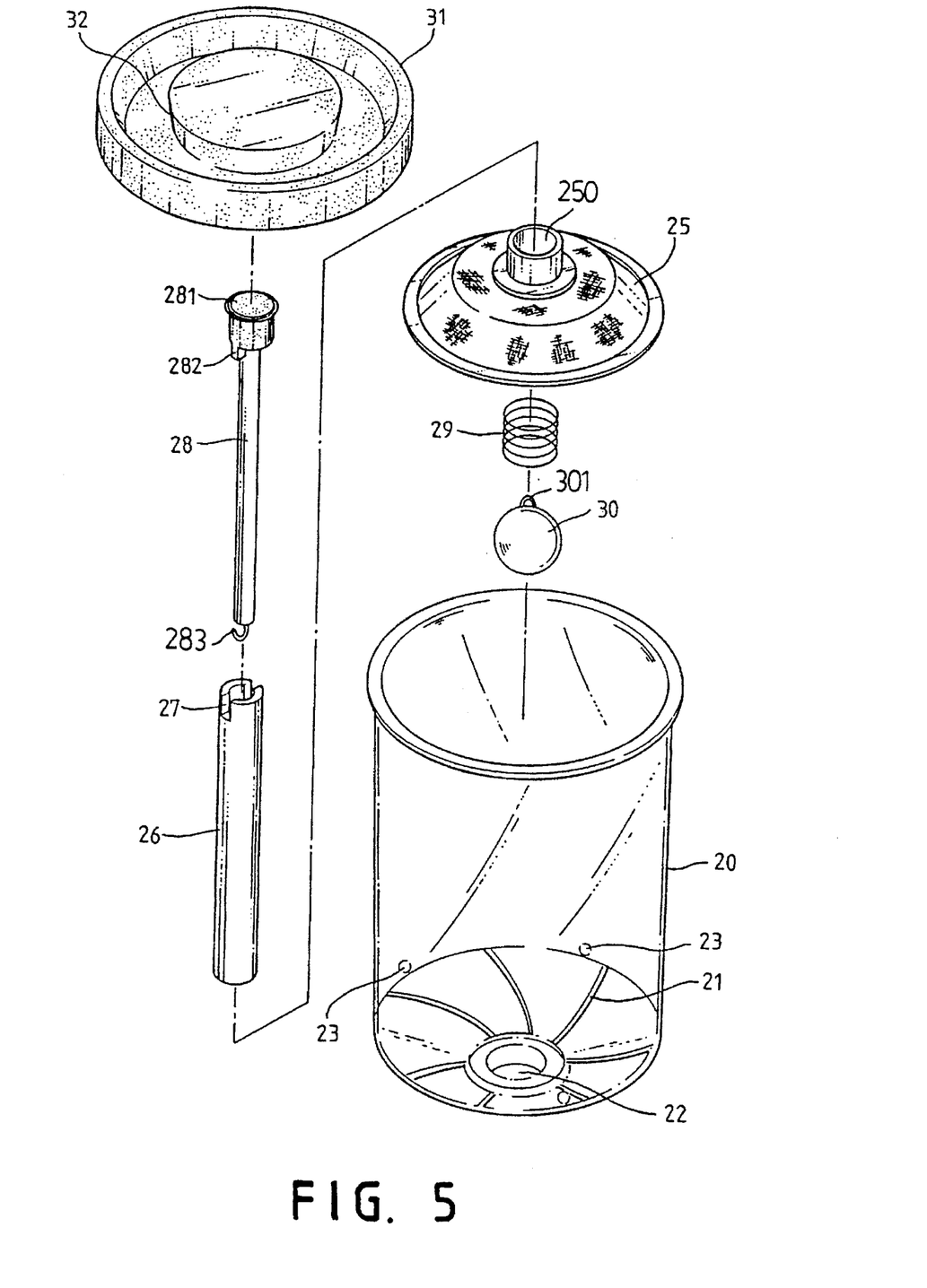
FIG. 5 is an exploded view of the infusion maker of the apparatus for making tea shown in FIG. 2.
Figure 6:
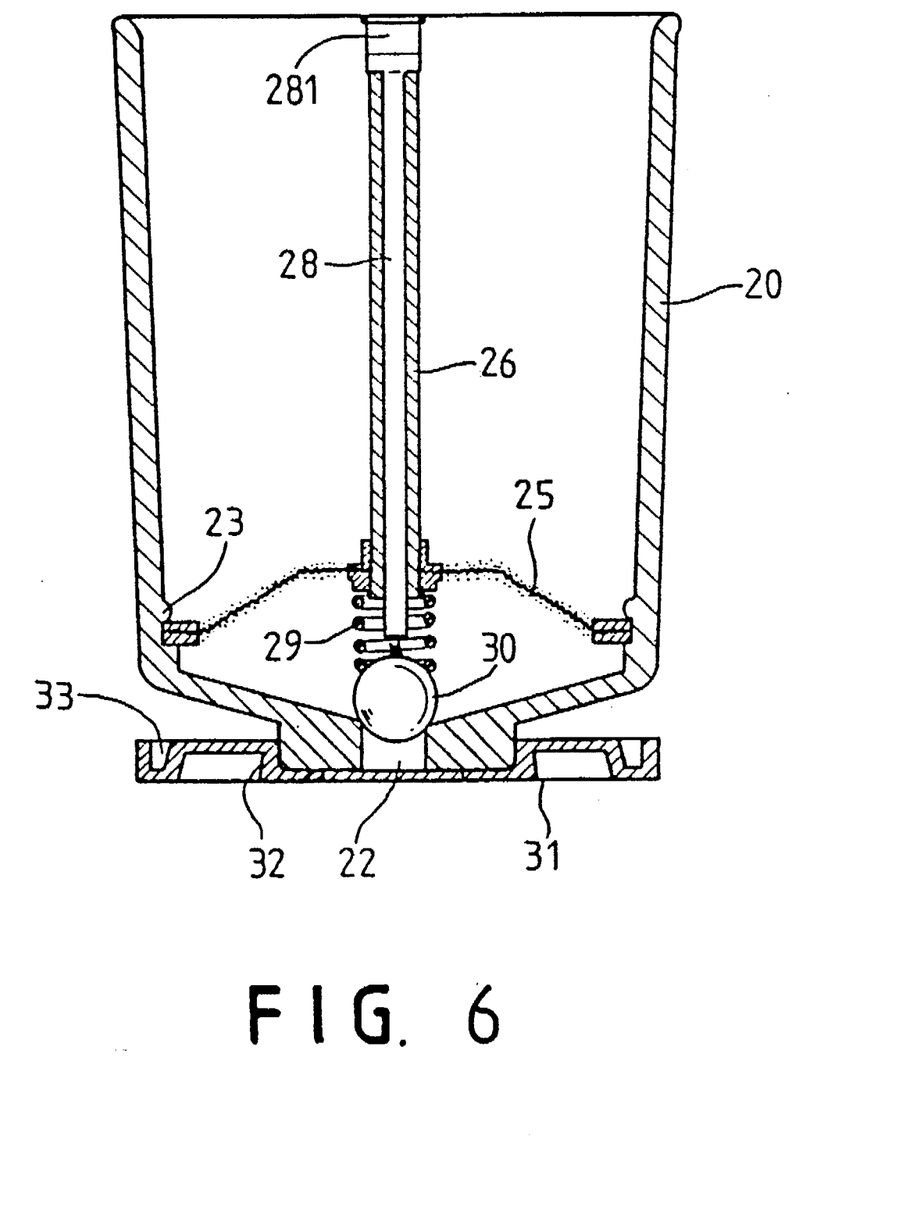
FIG. 6 is a sectional view of the present invention, showing the container lid turned upside down and the infusion container supported on container lid.

Referring to FIG. 4 and 5 and FIG. 3 again, the aforesaid infusion maker is comprised of an infusion container 20, a ball 30, a return spring 29, a wire gauze filter 25, a sleeve 26, a pull rod 28, and a container lid 31. The infusion container 20 comprises a drain hole 22 at the center of the bottom wall thereof, a plurality of smoothly curved grooves 21 disposed on the inside surface of the bottom wall and radially extending from the drain hole 22, a plurality of raised portions 23 raised from the inside wall near the bottom and adapted for holding the wire gauze filter 25 in the infusion container 20 over the drain hole 22. The bottom wall of the infusion container 20 is preferably curved inwards so that tea can be quickly guided out of the infusion container 20 through the drain hole 22. The smoothed curved grooves 21 are adapted to cause tea to turn quickly round and round when it flows downwards to the outside of the infusion container 20 through the drain 22. When the infusion container 20 is mounted inside the tea cup 10, it is supported on the steps 13, 14 of the longitudinal flow guide ribs 11, 12, and retained in place by the swivel locks 17, 18. The wire gauze filter 25 is installed in the infusion container 20, covered over the drain hole 22, and retained in place by the raised portions 23, having an axle housing 250 at the center. The sleeve 26 has a bottom end fastened to the axle housing 250, and a top end made with a notch 27. The ball 30 is mounted in the drain hole 22 to stop its passage, having a lifting eye 301 raised from the periphery. The return spring 29 is stopped between the ball 30 and the wire gauze filter 25. The pull rod 28 is slidably mounted in the axle housing 250 of the wire gauze filter 25, having a hook 283 at the bottom end inserted through the return spring 29 and fastened to the lifting eye 301 of the ball 30, a knob 281 at the top end, and a wedge 282 raised from the bottom of the knob 281 and forced into engagement with the notch 27 of the sleeve 26. The container lid 31 has a knob 32 raised from the recessed top side thereof adapted for the holding of the hand, and an annular coupling groove 33 at the bottom side (see FIG. 6) for coupling to the rim of the infusion container 20.

Referring to FIG. 4 again, the tea cup cover 34 has a downward annular flange 35 adapted for coupling to the knob 32 of the container lid 31, and an bottom annular groove 36 adapted for coupling to the rim of the infusion container 20.

Figure 7:
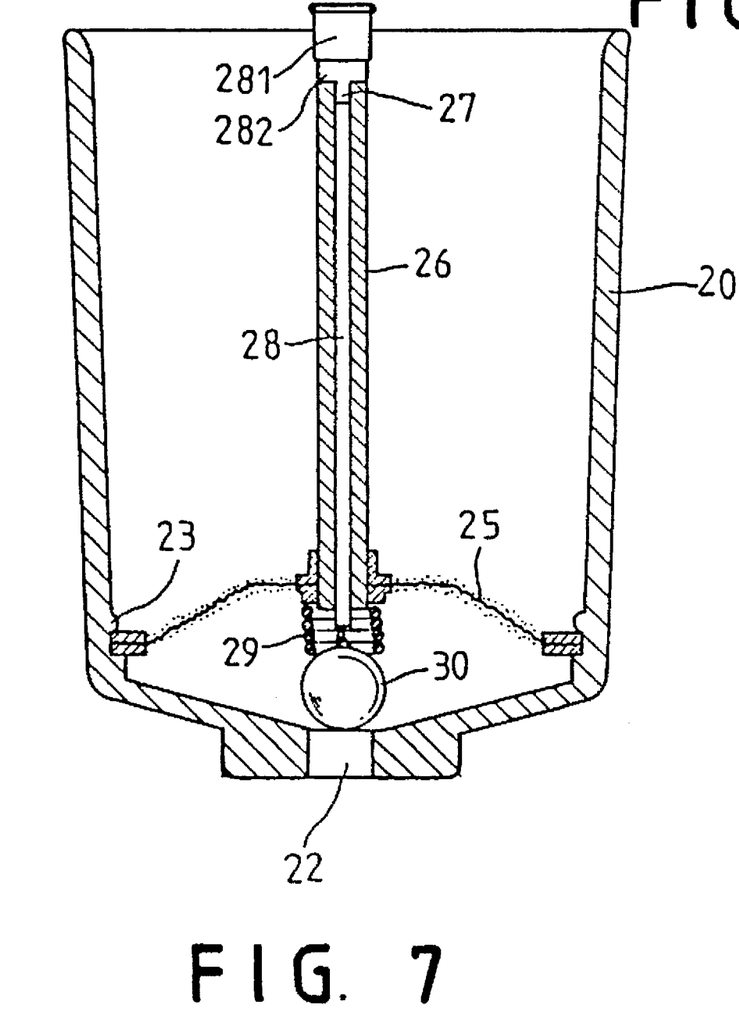
FIG. 7 is a sectional view of the infusion maker of the apparatus for making tea according to the present invention, showing the ball, showing the pull rod lifted and the ball moved away from the bottom drain hole of the infusion container.
Figure 7A:
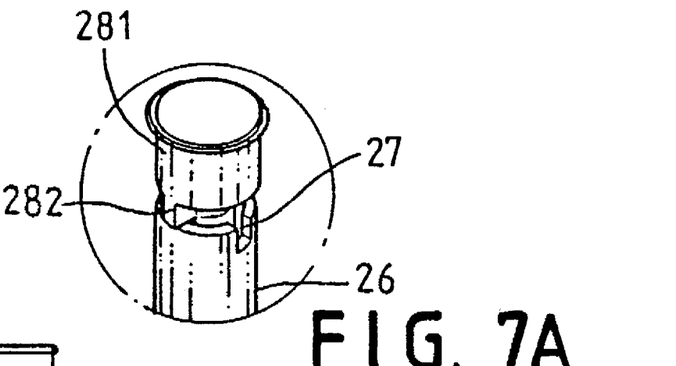
FIG. 7A is an enlarged view in elevation of the upper part of the pull rod of the infusion maker of FIG. 7.

Referring to FIG. 7 again, when tea is prepared, the knob 281 of the pull rod 28 is pulled upwards to lift the ball 30 from the drain hole 22, permitting tea to flow out of the drain hole 22 into the tea cup 10. When the wedge 282 is stopped above the top end of the sleeve 26 outside the notch 27, the ball 30 is retained in the open position outside the drain hole 22. When the wedge 282 is forced into engagement with the notch 27 again, the ball 30 is forced back into the drain hole 22, and the drain hole 22 is stopped again. When tea is completely carried away from the infusion container 20, the container lid 31 can be turned upside down to carry the infusion container 20 on the table (see FIG. 6). Furthermore, when to drink tea from the tea cup 10 as the tea cup 10 is tilted, tea is guided out of the tea cup 10 through the flow guide ribs 11, 12 into the user's mouth smoothly.

Figures 8, 8A:
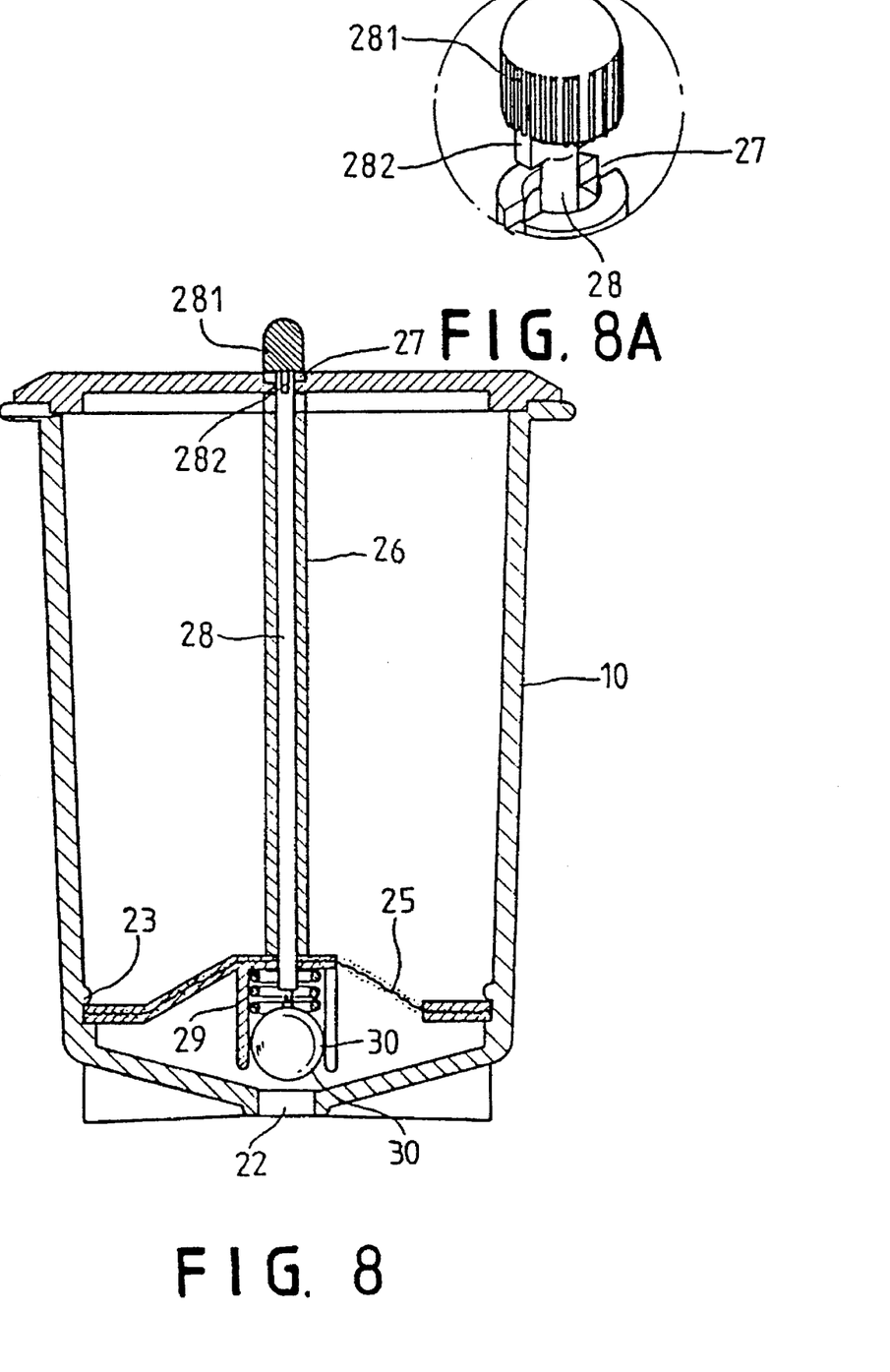
FIG. 8 is a sectional view of an alternate form of the infusion maker of the apparatus for making tea according to the present invention.
FIG. 8A is an enlarged view in elevation of the upper part of the pull rod of the infusion maker of FIG. 8.

FIG. 8 shows an alternate form of the present invention in which the knob 281 of the pull rod 28 extends out of the container lid through a hole (not shown) thereof.

Figure 9:
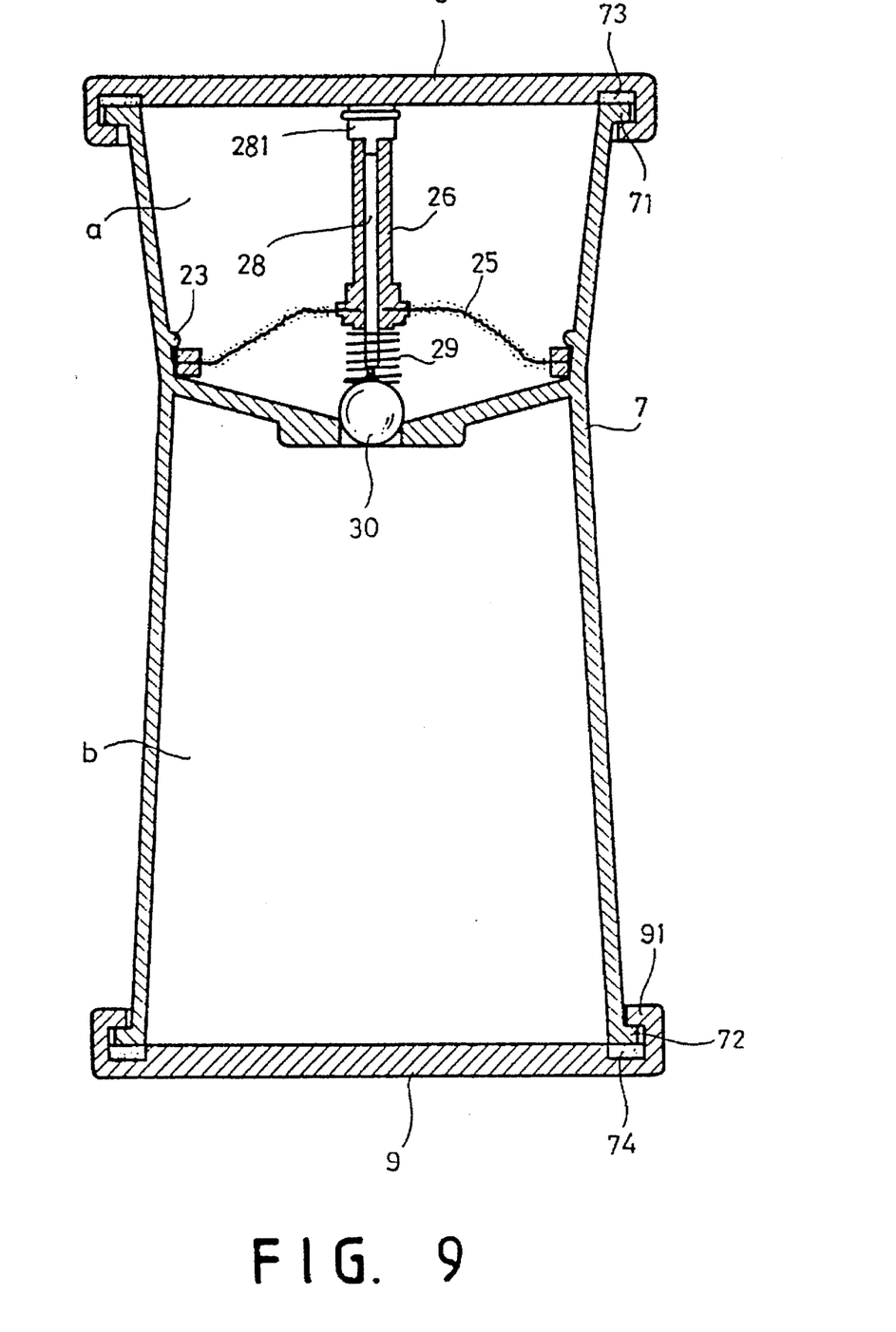
FIG. 9 is a sectional view of a second preferred embodiment according to the present invention.
Figure 10:
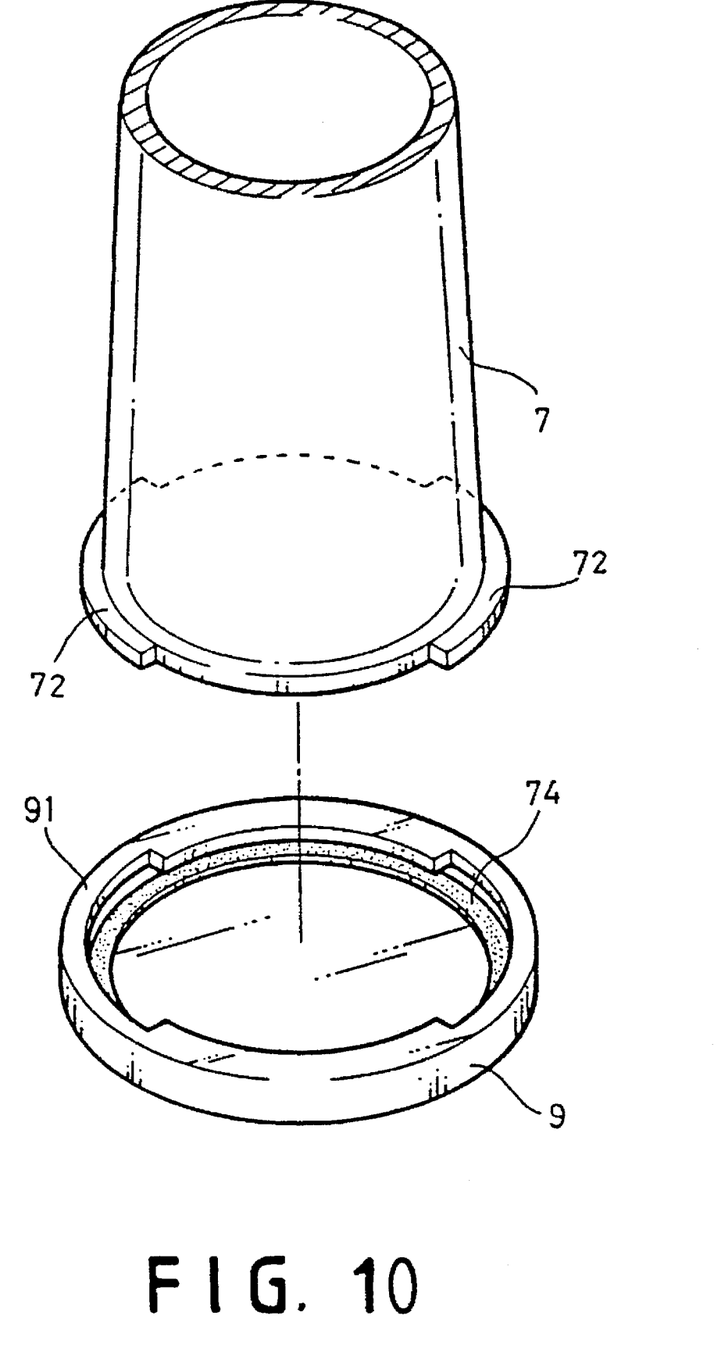
FIG. 10 illustrates the structure for engaging the tea cup cover with the tea cup according to the second preferred embodiment shown in FIG. 9.

FIGS. 9 and 10 illustrate a second preferred embodiment according to the present invention. As shown, the tea cup and the infusion container are integrally formed into a tea cup 7 with a reduced diameter close the upper end thereof. The tea cup 7 is formed with an upper chamber (a) for receiving tea leaves and a lower chamber (b) for receiving tea. The upper and lower ends of the tea cup 7 are formed with engaging edges 71 and 72 adapted to engage with the engaging flange 91 of the upper and lower covers 8 and 9. Further, two water-proof packing 73 and 74 are fitted within the upper and lower covers 8 and 9 for preventing water from flowing out of the tea cup 7.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An apparatus for making tea, comprising:

a tea cup, said tea cup comprising two longitudinal flow guide ribs raised from an inside wall thereof, each of said longitudinal flow guide ribs having a step in the middle, an upright top pin at the top, and a swivel locking plate turned about said upright top pin;

an infusion container supported on the steps of said longitudinal flow guide ribs inside said tea cup and locked in place by said swivel locking plates, said infusion container comprising a drain hole at the center of a bottom wall thereof, a plurality of smoothly curved grooves radially extending from said drain hole, and a plurality of raised portions raised around the bottom wall;

a wire gauze filter installed in said infusion container, covered over said drain hole, and retained in place by said raised portions of said infusion container, having an axle housing at the center;

a ball adapted for controlling the passage of said drain hole;

a return spring retained between said ball and said wire gauze filter;

a pull rod sliding in the axle housing of said wire gauze filter and pulled to lift said ball from said drain hole for permitting tea to flow out of said infusion container into said tea cup, having a bottom end inserted through said return spring and connected to said ball;

a container lid adapted for covering said infusion container, said container lid having a knob raised from a recessed top side thereof, and an annular groove at a bottom side thereof adapted for coupling to said infusion container; and a tea cup cover adapted for covering said tea cup, said tea cup cover having a downward flange adapted for coupling to the knob of said container lid, and an bottom annular groove adapted for coupling to said tea cup.

2. The apparatus as claimed in claim 1 wherein said container lid has a recessed bottom side adapted for carrying said infusion container on a flat surface when said container lid is turned upside down.

3. The apparatus as claimed in claim 1 wherein said container lid has a center hole adapted for the passing of the knob of said pull rod.

4. The apparatus as claimed in claim 1 wherein said tea cup and said infusion container are integrally formed into a tea cup with a reduced diameter close an upper end thereof, said tea cup being formed with an upper chamber for receiving tea leaves and a lower chamber for receiving tea, said tea cup being formed with two opposite engaging edges adapted to engage with engaging flanges of said upper and lower covers and provided with two water-proof packings fitted within said upper and lower covers for preventing water from flowing out of said tea cup.

* * * * *